US010534356B2

(12) United States Patent
Gonzalez et al.

(10) Patent No.: US 10,534,356 B2
(45) Date of Patent: *Jan. 14, 2020

(54) ACCESS ARBITRATION SYSTEM FOR SEMICONDUCTOR FABRICATION EQUIPMENT AND METHODS FOR USING AND OPERATING THE SAME

(71) Applicant: Brooks Automation, Inc., Chelmsford, MA (US)

(72) Inventors: Pablo Gonzalez, Fremont, CA (US); Gary Roy Watts, San Jose, CA (US)

(73) Assignee: Brooks Automation, Inc., Chelmsford, MA (US)

( * ) Notice: Subject to any disclaimer, the term of this patent is extended or adjusted under 35 U.S.C. 154(b) by 1073 days.

This patent is subject to a terminal disclaimer.

(21) Appl. No.: 14/530,102

(22) Filed: Oct. 31, 2014

(65) Prior Publication Data
US 2015/0057764 A1 Feb. 26, 2015

Related U.S. Application Data

(63) Continuation of application No. 13/605,941, filed on Sep. 6, 2012, now Pat. No. 8,881,297.

(51) Int. Cl.
*G05B 19/41* (2006.01)
*G05B 19/418* (2006.01)
*G06F 21/44* (2013.01)

(52) U.S. Cl.
CPC ........ *G05B 19/4189* (2013.01); *G06F 21/44* (2013.01); *G05B 2219/45031* (2013.01);
(Continued)

(58) Field of Classification Search
None
See application file for complete search history.

(56) References Cited

U.S. PATENT DOCUMENTS 4,995,430 A 2/1991 Bonora et al.
5,477,445 A * 12/1995 Weber ................ G05B 19/0426
700/83
(Continued)

FOREIGN PATENT DOCUMENTS

JP 60106256 A 6/1985
JP 2000053238 A 2/2000
(Continued)

OTHER PUBLICATIONS

Koch et al., Chapter 6 Integrated Optics, Handbooks of Optics, OSA(vol. I and vol. II), 1995.*

*Primary Examiner* — Jason Lin
(74) *Attorney, Agent, or Firm* — Penilla IP, APC

(57) ABSTRACT

An access arbitration module includes a plurality of active component communication ports for communicating with a plurality of active components, and includes a passive component communication port for communicating with a passive component. The access arbitration module also includes switching logic defined to control transmission of access communication protocol signals between each of the plurality of active component communication ports and the passive component communication port, such that an authorized one of the plurality of active component communication ports is connected in communication with the passive component communication port at a given time, and such that non-authorized ones of the plurality of active component communication ports are prevented from communication with the passive component communication port at the given time.

19 Claims, 13 Drawing Sheets

(52) U.S. Cl.
CPC ............... *Y02P 90/14* (2015.11); *Y02P 90/18* (2015.11); *Y02P 90/28* (2015.11)

(56) References Cited

U.S. PATENT DOCUMENTS

| | | | | |
|---|---|---|---|---|
| 6,195,593 | B1* | 2/2001 | Nguyen | G06F 17/5045 |
| | | | | 700/121 |
| 6,195,598 | B1 | 2/2001 | Bosqui et al. | |
| 6,240,335 | B1* | 5/2001 | Wehrung | G05B 19/4182 |
| | | | | 198/571 |
| 6,502,869 | B1 | 1/2003 | Rosenquist et al. | |
| 7,236,843 | B1* | 6/2007 | Wizelman | G05B 19/41865 |
| | | | | 700/100 |
| 7,720,557 | B2* | 5/2010 | Teferra | G05B 19/4189 |
| | | | | 414/935 |
| 7,816,617 | B2* | 10/2010 | Bennett | B07C 3/02 |
| | | | | 198/349 |
| 9,395,713 | B2* | 7/2016 | Grigoryev | G05B 19/4069 |
| 2002/0192055 | A1* | 12/2002 | Kobayachi | G06Q 10/04 |
| | | | | 414/200 |
| 2003/0100957 | A1* | 5/2003 | Chaffee | G05B 19/042 |
| | | | | 700/18 |
| 2006/0190118 | A1* | 8/2006 | Teferra | G05B 19/4189 |
| | | | | 700/112 |
| 2008/0015723 | A1 | 1/2008 | Chen et al. | |
| 2008/0126414 | A1 | 5/2008 | Parimi | |
| 2009/0276082 | A1 | 11/2009 | Murata | |
| 2010/0279438 | A1 | 11/2010 | An et al. | |
| 2011/0241845 | A1 | 10/2011 | Sullivan et al. | |
| 2011/0274521 | A1 | 11/2011 | Kuroyanagi | |
| 2012/0082063 | A1 | 4/2012 | Fujita | |

FOREIGN PATENT DOCUMENTS

| | | |
|---|---|---|
| JP | 2009071120 A | 4/2009 |
| TW | 200704573 A | 2/2007 |
| TW | 200805552 A | 1/2008 |
| TW | 201200441 A | 1/2012 |
| TW | 14530102 A | 10/2014 |

* cited by examiner

ACCESS ARBITRATION SYSTEM FOR SEMICONDUCTOR FABRICATION EQUIPMENT AND METHODS FOR USING AND OPERATING THE SAME

CLAIM OF PRIORITY

This application is a continuation application under 35 U.S.C. 120 of prior U.S. application Ser. No. 13/605,941, filed Sep. 6, 2012. The disclosure of the above-identified patent application is incorporated herein by reference in its entirety for all purposes.

BACKGROUND

Modern semiconductor factories use a variety of automation systems for movement of materials and control of fabrication processes. As used herein, the terms semiconductor factory and semiconductor fab are synonymous, and are respectively abbreviated as factory and fab. The various automation systems within the fab include hardware and software that are interfaced to work together to automate the movement of material, data, and control through the fab. Major automation systems in the fab may include: MES (Manufacturing Execution System), AMHS (Automated Material Handling System), MCS (Material Control System), station Control for tool connectivity, EFEMs (Equipment Front-End Modules) and loadports for interface between factory tools and the AMHS, material tracking systems like radiofrequency identifier (RFID) and barcode, and associated software products that may or may not be used in a fab and may or may not be bundled together to handle functions like fault detection, recipe management, scheduling and dispatch, statistical process control (SPC), and others. The AMHS can include sub-systems such as an OHT (overhead hoist transport) system, a near-tool container buffer system, and AGVs (automated guided vehicles). Additionally, the fab can include manually operated material handling and movement systems, such as PGVs (person guided vehicles), among others.

During semiconductor manufacturing, a semiconductor wafer undergoes a plurality of process steps, each of which are performed by a specialized process tool. Workpiece containers are used to convey semiconductor wafers from one tool to another. Each workpiece container is capable of transporting a number of wafers of a specific diameter. The workpiece containers are designed to maintain a protected internal environment to keep the wafers free of contamination, e.g., by particulates in the air outside the workpiece container. Workpiece containers are also known for conveying other types of substrates, such as reticles, liquid crystal panels, rigid magnetic media for hard disk drives, solar cells, etc.

It is an ongoing desire to improve fab logistics and productivity in the areas of cycle time, throughput, WIP (Work-In-Progress) levels, material handling, etc Improvement in fab logistics can be of particular concern with regard to fabrication of larger wafers. For example, fabrication of 300 mm and larger wafers requires more automated transport through the fab, thereby benefiting from improved fab logistics. Also, fabrication of smaller technology node devices having decreased line widths may require more process steps, which in turn requires more automated transport through the fab and increases the complexity of cycle time control in the fab. Therefore, improvement in fab logistics can also benefit fabrication of smaller technology node devices.

FIG. 1 shows an example floorplan 101 of a portion of a fab. The floorplan includes a many different fabrication process and/or metrology tools 103A-103L. The fabrication tools can include essentially any type of semiconductor wafer fabrication tool, including but not limited to, wafer plasma processing tools for material etching and/or deposition, wafer cleaning tools, wafer rinsing tools, wafer planarization tools, among others. The floorplan can also include material handling equipment, including but not limited to, lifters/elevators, OHT (overhead hoist transport) systems, OHV's (overhead hoist vehicles), RGV's (rail-guided vehicles), floor conveyers, STC's (material storage/stockers), among others. The floorplan of FIG. 1 shows example travel routes 105 of material handling systems, such as the OHT system, the RGV system, and/or floor conveyers, among others. The floorplan of FIG. 1 also shows a number of material transport vehicles 107, such as OHV's, RGV's, among others, traveling along the various travel routes 105 to move workpiece containers carrying semiconductor wafers or other types of workpieces.

It should be understood that there is an essentially limitless number of floorplan variations possible with a given fab. For example, different fabs can include different combination of process and/or metrology tools. Also, different fabs can include different material handling systems and associated routes. However, what most fabs share is a need to accurately and reliably move workpieces between locations in a most efficient manner as possible. The OHT, RGV, AGV, PGV, and floor conveyer systems, among others, provide a substantial ability to move workpiece containers between locations within a fab. Additionally, the near-tool workpiece container buffering capability provided by the near-tool container buffer system allows for improved management of workpiece container movement and readiness within the fab.

Conventionally, access by the various AMHS sub-systems to certain stations within the fab, such as loadports, has been necessarily restricted to ensure that the various AMHS sub-systems do not collide or interfere with each other in accessing a given station within the fab at a given time. However, while implementation of such access restrictions on the various AMHS sub-systems is effective in avoiding interference conditions within the fab, implementation of such access restrictions on the various AMHS sub-systems can inefficiencies in workpiece container handling within the fab and corresponding reductions in workpiece throughput from the fab. It is within this context of improving AMHS access management that the present invention arises.

SUMMARY

In one embodiment, an access arbitration module for a passive component within a semiconductor fabrication facility is disclosed. The access arbitration module includes a plurality of active component communication ports for communicating with a plurality of active components. The access arbitration module also includes a passive component communication port for communicating with a passive component. The access arbitration module further includes switching logic defined to control transmission of access communication protocol signals between each of the plurality of active component communication ports and the passive component communication port, such that an authorized one of the plurality of active component communication ports is connected in communication with the passive component communication port at a given time, and such that non-authorized ones of the plurality of active component communication ports are prevented from communication with the passive component communication port at the given time.

In another embodiment, a system is disclosed to include a loadport for a semiconductor fabrication tool, a first active component, a second active component, and an access arbitration module. Each of the first and second active components is defined to deliver a workpiece container to the loadport. The access arbitration module is defined to communicate with each of the loadport, the first active component, and the second active component. The access arbitration module is defined to control transmission of access communication protocol signals between each of the first and second active components and the loadport, such that an authorized one of the first and second active components is allowed to access the loadport at a given time, and such that a non-authorized one of the first and second active components is prevented from accessing the loadport at the given time.

In another embodiment, a method is disclosed for controlling access to a loadport of a semiconductor fabrication tool. The method includes transmitting a first access protocol signal from a first active component to the loadport. The method also includes transmitting a second access protocol signal from a second active component to the loadport. The method also includes intercepting the first and second access protocol signals before they arrive at the loadport. The method also includes determining which of the first and second active components is currently authorized to access the loadport. The method also includes transmitting the intercepted first access protocol signal through to the loadport and blocking the intercepted second access protocol from transmission to the loadport, when the first active component is authorized to access the loadport. The method also includes transmitting the intercepted second access protocol signal through to the loadport and blocking the intercepted first access protocol from transmission to the loadport, when the second active component is authorized to access the loadport.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

An access arbitration module and system is described herein to efficiently manage potentially contentious access by AMHS sub-systems to various components within the fab. For ease of description, the access arbitration module and system is described herein with regard to managing access to loadports by two AMHS sub-systems, including the OHT (overhead hoist transport) system and the near-tool container buffer system. However, it should be understood that the access arbitration module and system as disclosed herein is not limited to use with OHT, near-tool container buffer system, and loadports. More specifically, the access arbitration module and system disclosed herein can be implemented to provided access management between any number of active systems and any number of passive systems within the fab, where each active system operates as an access requestor, and each passive system operates as a destination of the requested access.

It should be understood that the term "container" as used herein refers to a workpiece container for use within a fab, including but not limited to a FOUP (Front Opening Unified Pod), a FOSB (Front-Opening Shipping Box), a SMIF (Standard Mechanical Interface) pod, a SRP (Single Reticle Pod), an open substrate cassette, among many others. Also, it should be understood that the term "workpiece" as used herein can refer to a semiconductor wafer, a semiconductor substrate, a reticle, among many others. Moreover, the term "workpiece" as used herein can refer to any item that is worked upon by process and/or metrology tools within the fab. Also, although described herein by way of example within the context of a fab in which workpieces are transported in containers, it should be understood that the access arbitration module and system disclosed herein can be utilized in other manufacturing facilities in which multiple active systems compete for access to a shared passive system, such as in the case of manufacturing facilities for liquid crystal panels, rigid magnetic media, e.g., for hard disk drives, solar cells, among many others.

Figure 2:
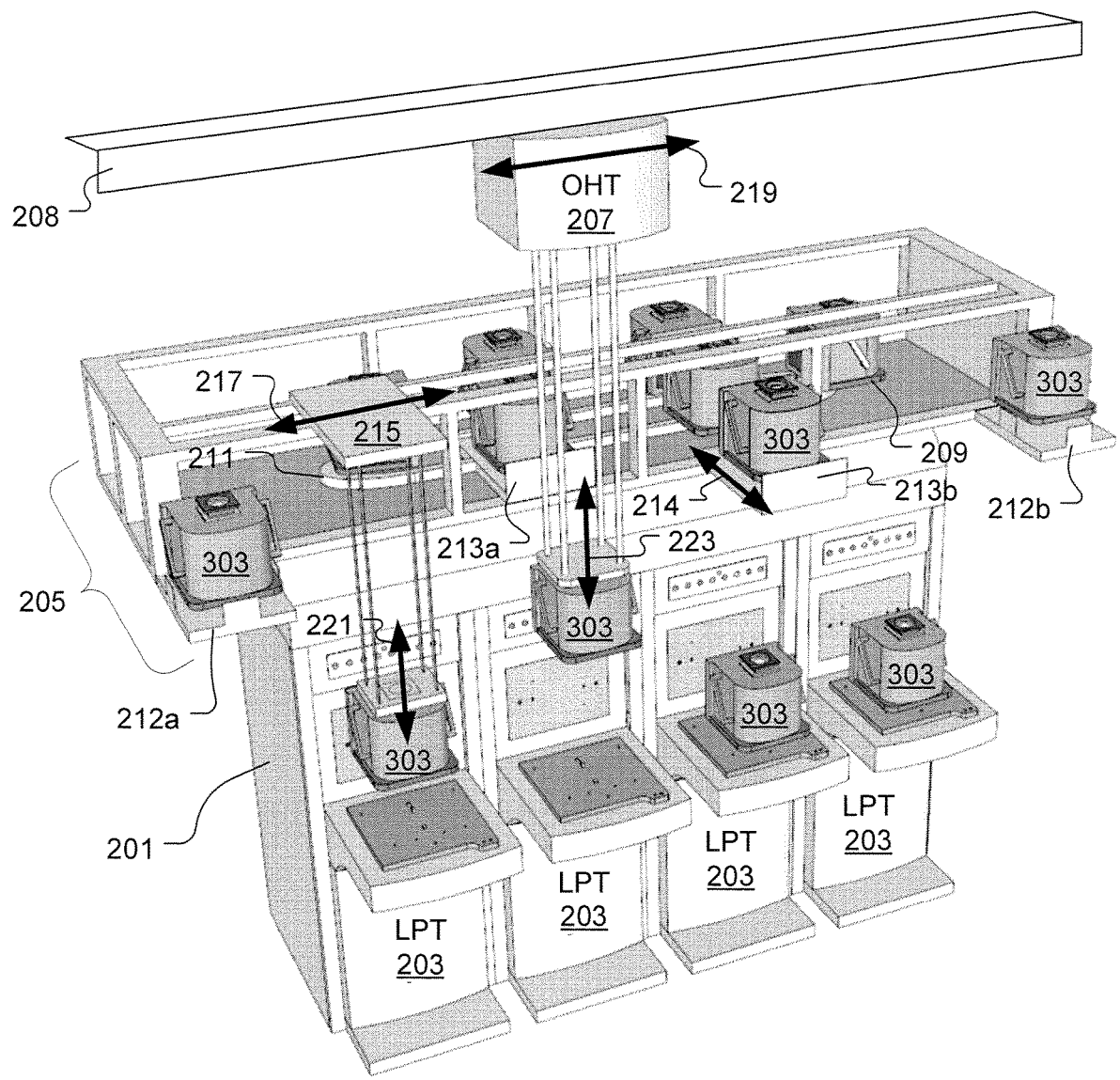
FIG. 2 shows a portion of a fab in which a tool 201 is provided with four loadports (LP's) 203, in accordance with one embodiment of the present invention.

FIG. 2 shows a portion of a fab in which a tool 201 is provided with four loadports (LP's) 203, in accordance with one embodiment of the present invention. Each LP 203 is defined to provide a standard mechanical interface to wafer fabrication production tools (process and/or metrology tools) to enable loading/unloading of containers into/out of workpiece fabrication production tools, while ensuring protection of workpieces therein from contamination. FIG. 2 also shows a near-tool container buffer system 205 positioned above the tool 201 and LP's 203. FIG. 2 further shows an OHT 207 configured above the near-tool container buffer system 205 so as to travel over the LP's 203. It should be understood that the configuration of the tool 201, LP's 203, near-tool container buffer system 205, and OHT 207 in FIG. 2 is provided by way of example to facilitate description of the access arbitration module and system herein and is not to be construed as limiting in any way to the access arbitration module and system disclosed herein. Specifically, it should be understood that the access arbitration module and system disclosed herein can be implemented with essentially any configuration of components within a fab where multiple components may compete for access to the same component at the same time. In the example of FIG. 2, the OHT 207 and near-tool container buffer system 205 may compete for access to the same LP 203 at the same time.

Figure 1:
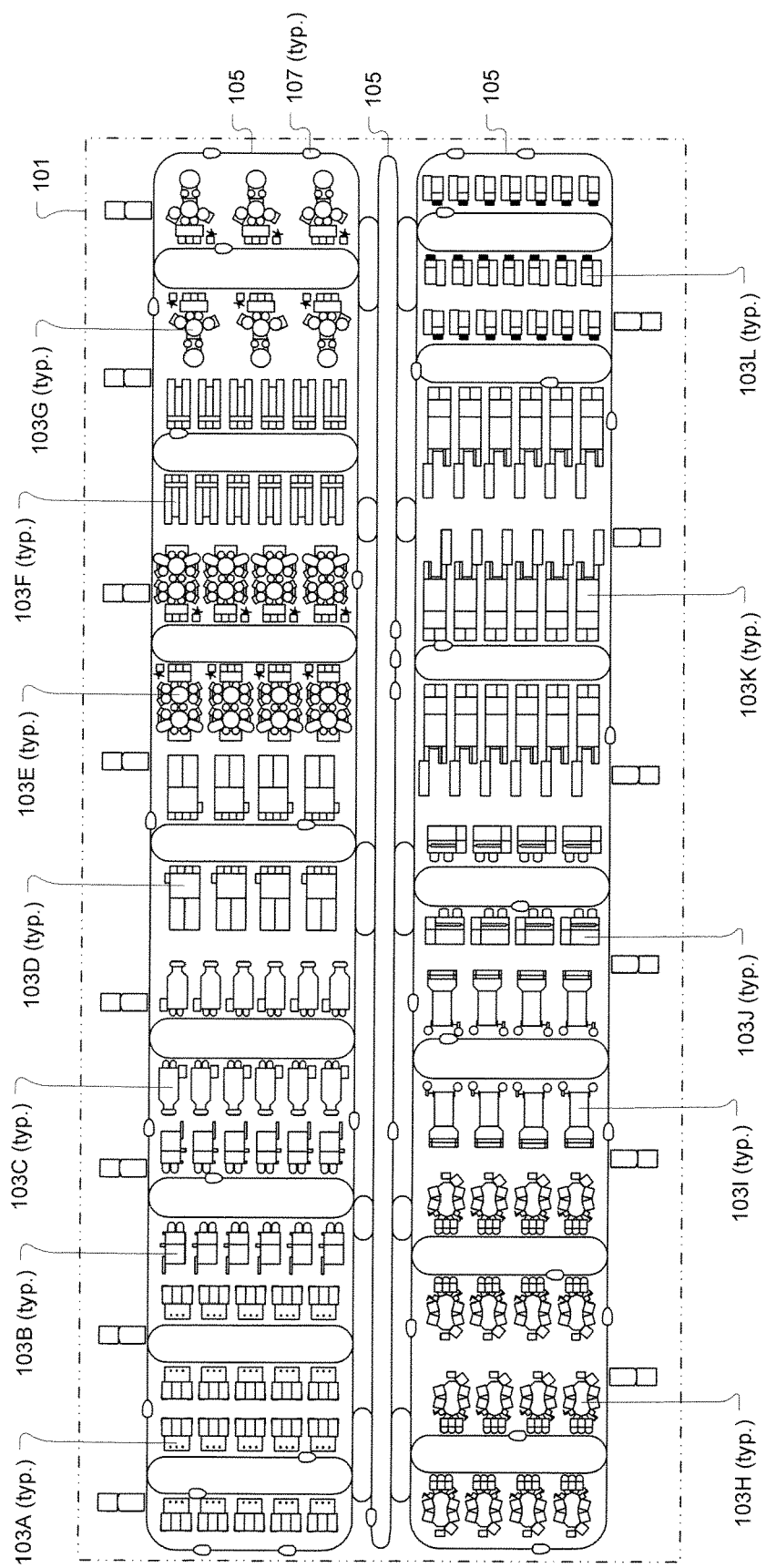
FIG. 1 shows an example floorplan 101 of a portion of a fab.
Figure 3A:
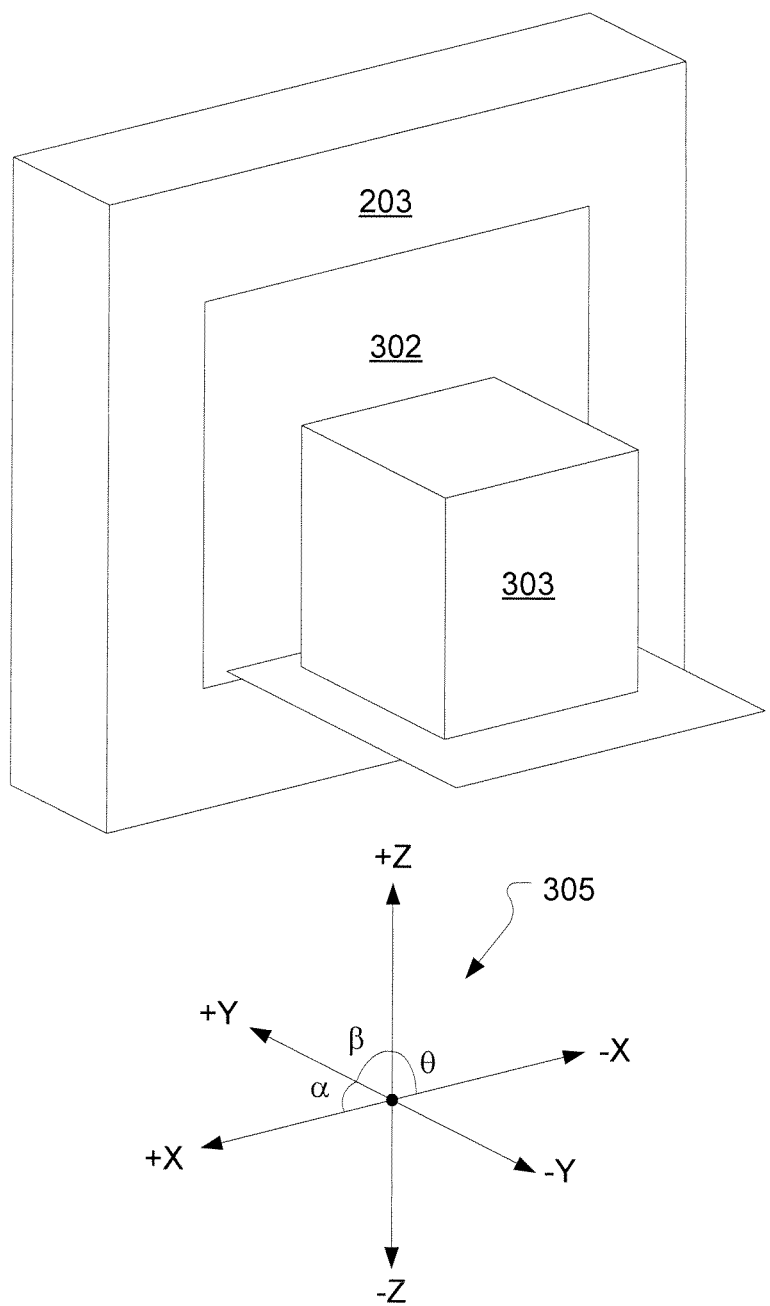
FIG. 3A shows an articulation schematic of each LP 203 having a window 302 through which a container 303 is moved.
Figure 3B:
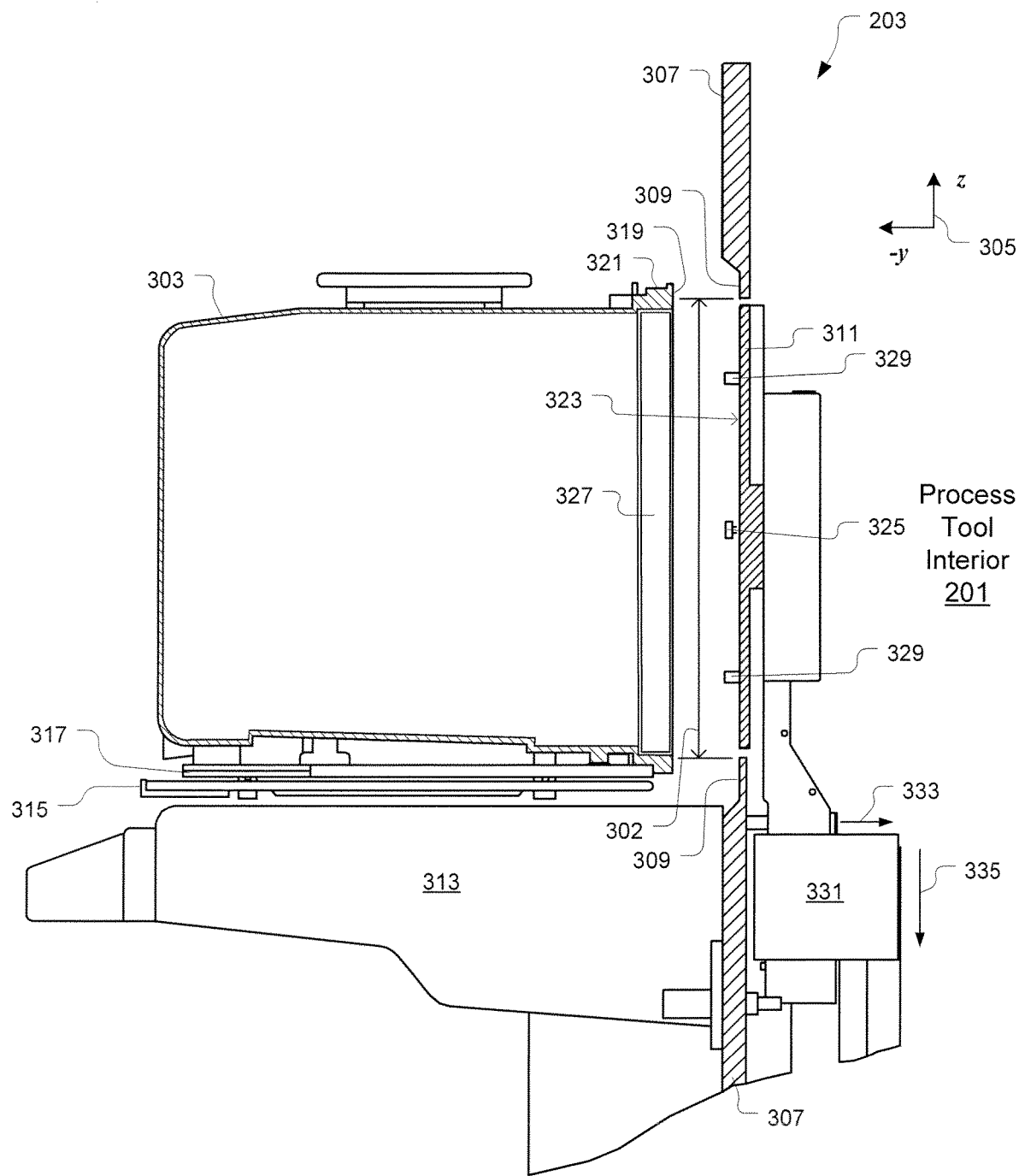
FIG. 3B shows the LP 203 configured to interface with the container 303, defined as a FOUP by way of example.

FIG. 3A shows an articulation schematic of each LP 203 having a window 302 through which a container 303 is moved. In one embodiment, the LP 203 is defined to move the container 303 through the window 302 in a Y direction, and is also defined to move the container 303 in a Z direction. FIG. 3B shows the LP 203 configured to interface with the container 303, defined as a FOUP by way of example. The LP 203 is attached to a front end of the process tool 201 as described, for example, with reference to FIGS. 1 and 2 of U.S. Pat. No. 6,502,869, which issued Jan. 7, 2003 to Rosenquist et al., and is incorporated herein by reference in its entirety. For purposes of description, the "front" of LP 203 faces away from the process tool 201, i.e., faces toward the negative Y direction as indicated by coordinate axes 305. The "front" of container 303 is the side facing the front of the LP 203.

The LP 203 includes a tool interface 307. In the semiconductor industry, tool interface 307 is often in conformance with an industry standard referred to as "Box Opener/Loader-to-Tool Standard Interface" (BOLTS), commonly referred to as a BOLTS interface or a BOLTS plate. Tool interface 307 includes the window 302 surrounded by a recessed shoulder 309. The window 302 is substantially occluded by a port door 311. The port door 311 forms a proximity seal with a boundary of the window 302 to prevent contaminants from migrating to the interior of the process tool 201. A proximity seal provides a small amount of clearance, e.g., about 1 mm, between the parts forming the proximity seal. The small clearance of the proximity seal allows air at a higher pressure to escape from the interior of the process tool 201 and sweep away any particulates from the sealing surfaces of the proximity seal.

The LP 203 also includes an advance plate assembly 313 having an advance plate 315. In one embodiment, registration pins (not shown) mate with corresponding slots or recesses in the bottom support 317 of container 303, to facilitate alignment of the container 303 on the advance plate 315. The container 303 may conform to industry standards for Front Opening Unified Pods (FOUPs) or a different standard. The advance plate assembly 313 has an actuator (not shown) that slides the advance plate 315 in the Y direction between the retracted position shown in FIG. 3B and an advanced position that brings the container 303 into close proximity with the tool interface 307. When the container 303 is in the advanced position, a front surface 319 of a flange 321 forms a proximity seal with the recessed shoulder 309 of tool interface 307.

A front surface 323 of the port door 311 includes a pair of latch keys 325. The latch keys 325 include a post that extends away from the port door 311 and is substantially perpendicular to port door 311, and a crossbar at the distal end of the post. The crossbar extends perpendicularly to the post to form a "T" therewith. The port door 311 includes an actuator that interacts with the latch keys 325, causing the latch keys 325 to rotate on the axis of the post. As the container 303 moves to the advanced position, the latch keys 325 are inserted into corresponding latch key receptacles (not shown) of a container door 327 of container 303. The latch keys 325 are then rotated on the axis of the post, thereby interacting with a mechanism (not shown) internal to the container door 327, causing the container door 327 latches to disengage from the flange 321 of the container 303.

An example of a door latch assembly within a container door adapted to receive and operate with latch keys is disclosed in U.S. Pat. No. 4,995,430, entitled "Sealable Transportable Container Having Improved Latch Mechanism," which is incorporated herein by reference in its entirety. Another example is presented in U.S. Pat. No. 6,502,869, issued on Jan. 7, 2003 to Rosenquist et al., also incorporated herein by reference in its entirety. In addition to disengaging the container door 327 from the container 303, rotation of the latch keys 325 locks the latch keys 325 in their respective latch key receptacles, thereby coupling the container door 327 to the port door 311. In one embodiment, the LP 203 includes two latch keys 325, that are structurally and operationally identical to each other. Additionally, alignment pins 329 are provided to facilitate alignment between the port door 311 and the container door 327, so that container door 327 will be sufficiently aligned to enable passage through the window 302 toward the interior of the process tool 201.

In the LP 203, once the container door 327 latches are disengaged from the flange 321, the port door 311 is retracted in the horizontal direction (Y direction) by a mechanism 331, as indicated by arrow 333, thereby removing the container door 327 from the container 303. Following retraction of the port door 311 (with container door 327 coupled thereto) in the horizontal direction 333, the mechanism 331 is operated to move the port door 311 (with container door 327 coupled thereto) downward in a vertical direction (Z direction), as indicated by arrow 335, thereby clearing the window 302 to enable unobstructed access from the interior of the process tool 201 to the workpieces inside the container 303.

With reference back to FIG. 2, the near-tool container buffer system 205 is described in detail as "storage system 100" in U.S. patent application Ser. No. 12/780,761, filed on May 14, 2010, entitled "Substrate Container Storage System," which is incorporated by reference herein in its entirety. Also, the near-tool container buffer system 205 is further described in detail as "storage system 100" in U.S. patent application Ser. No. 12/780,846, filed on May 14, 2010, entitled "Integrated Systems for Interfacing with Substrate Container Storage Systems," which is incorporated by reference herein in its entirety.

The near-tool container buffer system 205 includes a number of movable storage shelves 209, each of which is each connected to a common drive mechanism to provide for controlled movement of the storage shelves 209 in a carousel-like manner around a drive track 211. The near-tool container buffer system 205 also includes static ports 212a and 212b upon which a container 303 can be placed and removed by the OHT system 207. The near-tool container buffer system 205 further includes active ports 213a and 213b, each of which is defined and configured to be horizontally extended and retracted, as indicated by arrow 214. For example, active port 213a is depicted in its retracted position, and active port 213b is depicted in its extended position.

The active ports 213a and 213b are mechanisms that can be used to load a container 303 on to a storage shelf 209 and unload a container 303 from a storage shelf 209. The active ports 213a and 213b include a port plate that can be moved vertically to either an upper or lower position. When retracted with their port plate in the lower position, the active ports 213a, 213b are cleared from the travel path of the storage shelves 209. When the storage shelves 209 are moved to position a container 303 over the active port 213a, 213b, the port plate of the active port 213a, 213b can be moved to its upper position, so as to engage the container 303 and lift the container 303 from the storage shelf 209. Then, the active port 213a, 213b can be extended horizontally to move the container 303 away from the storage shelf 209 to a position at which the container 303 can be engaged by a shuttle lift 215 of the near-tool container buffer system 205. It should be appreciated that the active port 213 can be operated in a reverse manner from that described above in order to move the container 303 back from the shuttle lift 215 engagement position to a storage shelf 209.

The shuttle lift 215 is defined and configured to travel back and forth along a length of the near-tool container buffer system 205, as indicated by arrow 217, at a position above the static ports 212a, 212b, and above the active ports 213a, 213b in their extended position. The shuttle lift 215 is equipped with a gripper and hoist mechanism that provides for gripping of an upper handle of a container 303 and vertical movement of the container, as indicated by arrow 221. In this manner, the shuttle lift 215 can be positioned and operated to lift containers 303 from and place containers 303 on any static port 212a, 212b, and extended active port 213a, 213b. Also, the shuttle lift 215 can be positioned and operated to lift containers 303 from and place containers 303 on the advance plate assembly 313 of any LP 203.

Additionally, the OHT 207 can move a container 303 between stockers, storage systems and tools by way of an OHT rail 208, as indicated by arrow 219. Similar to the shuttle lift 215, the OHT 207 is equipped with a gripper and hoist mechanism that provides for gripping of an upper handle of a container 303 and vertical movement of the container, as indicated by arrow 223. In this manner, the OHT 207 can be positioned and operated to lift containers 303 from and place containers 303 on any static port 212a, 212b, any extended active port 213a, 213b, and any LP 203 advance plate assembly 313.

Given that both the OHT 207 and near-tool container buffer system 205 shuttle lift 215 are capable of moving containers to and from each LP 203 at a given time, it should be appreciated that contention between the OHT 207 and near-tool container buffer system 205 for access to a given LP 203 at the same time must be managed to avoid collision and possible workpiece or equipment damage. Additionally, access by the OHT 207 to a given LP 203 is further complicated when the near-tool container buffer system 205 has an extendable active port 213a, 213b positioned over the given LP 203, as the active port 213a, 213b in its extended position would block the OHT 207 hoist's vertical travel path used for movement of the container 303 to and from the given LP 203.

Once approach to managing LP 203 access contention is to restrict the OHT 207 to movement of containers 303 to and from the static ports 212a, 212b of the near-tool container buffer system 205, and utilize the shuttle lift 215 to move containers 303 between the near-tool container buffer system 205 and the LP 203. However, while this approach can be effective in eliminating LP 203 access contention between the OHT 207 and near-tool container buffer system 205, this approach can be inefficient for tool 201 utilization and ultimately for workpiece throughput within the fab. For instance, it is conceivable that the shuttle lift 215 may become a bottleneck to LP 203 access if the shuttle lift 215 is busy or inoperable when one or more LP's 203 are available for access. Therefore, it is of interest to allow for direct access to LP's 203 by both the OHT 207 and shuttle lift 215. However, for this to occur, it is necessary to manage the potential LP 203 access contention between the OHT 207 and shuttle lift 215, as well as the potential travel path interference between the active ports 213a, 213b and the OHT 207.

Figure 4:
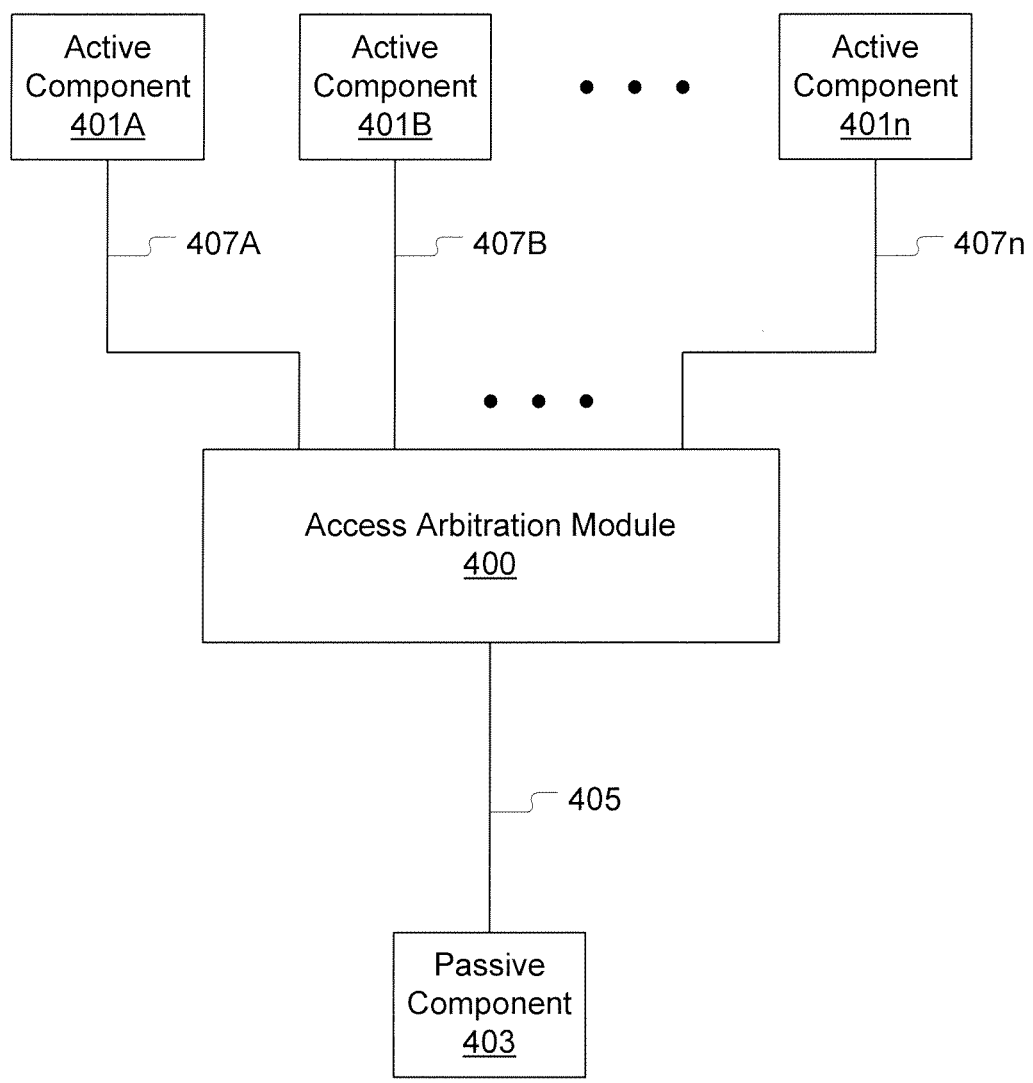
FIG. 4 shows an access arbitration module 400 defined to control access to a passive component 403 by a plurality of active components 401A-401n, in accordance with one embodiment of the present invention.

FIG. 4 shows an access arbitration module 400 defined to control access to a passive component 403 by a plurality of active components 401A-401n, in accordance with one embodiment of the present invention. Each active component 401A-401n is a component that requests access to another component, i.e., to a passive component. For example, within the context of SEMI Standard SEMI E84-1109, active components 401A-401n correspond to active equipment, which is defined as equipment that loads/unloads a cassette onto/from the cassette stage of another piece of equipment. The passive component 403 is a component to which any active component 401A-401n requires access. For example, within the context of SEMI Standard SEMI E84-1109, passive component 403 corresponds to passive equipment, which is defined as equipment that is loaded/unloaded by active equipment.

Each passive component provides a communication link through which an active component can communicate so as to initiate and conduct access to the passive component. This communication between active and passive components complies with a formal communication protocol to ensure proper interfacing between the active and passive components. In one embodiment, an E84 communication protocol in compliance with SEMI Standard SEMI E84-1109 is enforced between active and passive components. In this embodiment, a successful interchange between active and passive components requires that both the active and passive component follow the E84 communication protocol. If either the active or passive component fails to comply with the E84 communication protocol in establishing the interchange between the active and passive components, the interchange will not occur, and the active component will not be allowed access to the passive component. Therefore, interruption of the communication between the active and passive components provides a mechanism by which access to the passive component by the active component can be denied.

Normally, a passive component would provide a communication link to one active component, thereby avoiding possible access contention to the passive component. In other words, only the active component having access to the communication link would have access to the passive component. With implementation of the access arbitration module 400, a communication link 405 to the passive component 403 is intercepted by the access arbitration module 400. Also, with implementation of the access arbitration module 400, respective communication links 407A-407n to the plurality of active components 401A-401n are intercepted by the access arbitration module 400.

The access arbitration module 400 is defined to function in a multiplexer-like manner to provide controlled switching of the passive component 403 communication link 405 to only one of the communication links 407A-407n of the active components 401A-401n at a time, thereby restricting the communication necessary for access to the passive component 403 to only one of the plurality of active components 401A-401n at a given time. For description purposes, the one active component 401A-401n that is provided access to the passive component 403 at a particular time is referred to as the permitted component. Additionally, through the communication links 407A-407n with the active components 401A-401n, the access arbitration module 400 is defined to direct the active components 401A-401n that are not currently provided access to the passive component 403, i.e., that are not the permitted component, to take whatever action is necessary, if any, to avoid physical interference with the permitted component's access to the passive component 403.

Figure 5:
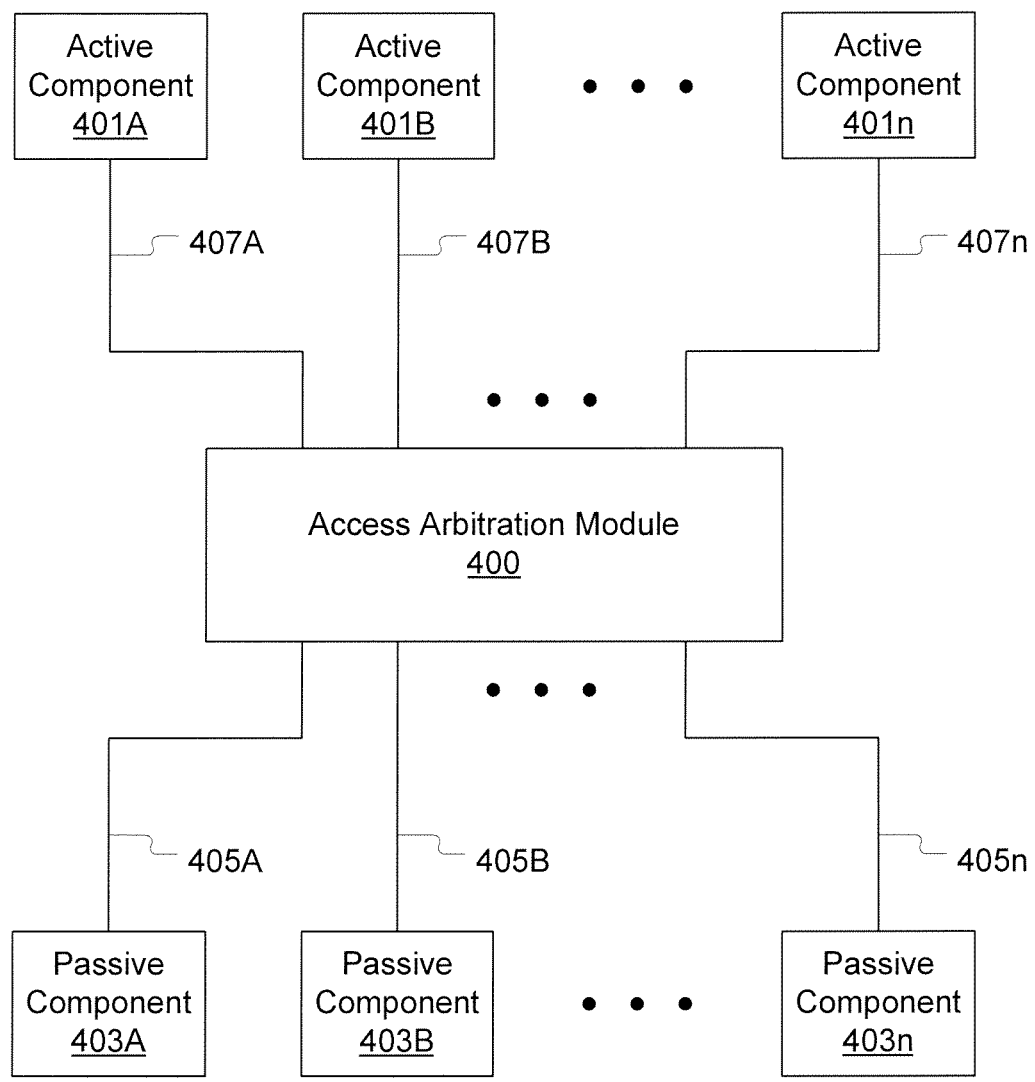
FIG. 5 shows the access arbitration module 400 with multiple passive components 403A-403n connected to the access arbitration module 400 through respective communication links 405A-405n, in accordance with one embodiment of the present invention.

Although FIG. 4 shows the access arbitration module 400 connected to communicate with the one passive component 403, it should be understood that the access distribution module 400 can be defined to control access to any number of passive components 403 by the plurality of active components 401A-401n. FIG. 5 shows the access arbitration module 400 with multiple passive components 403A-403n connected to the access arbitration module 400 through respective communication links 405A-405n, in accordance with one embodiment of the present invention. In the embodiment of FIG. 5, the access arbitration module 400 operates to ensure that each of the multiple passive components 403 is accessible by one of the plurality of active components 401A-401n at a given time. Also, the access arbitration module 400 is defined and operated to ensure that each of the active components 401A-401n is directed to avoid interference with each permitted component's access to their target passive component 403.

With reference back to FIG. 2, it should be understood that container 303 transfers to the LP's 203 are interlocked with signals that conform to the SEMI E84 standard. The E84 standard prescribes an exchange of several signals that assure that each step of a transfer is allowed and that it is successfully completed. The E84 signals are usually transmitted through an optical link that is aligned with the active device, i.e., OHT 207 or near-tool container buffer system 205, when aligned over the LP 203. Thus, with reference to FIGS. 4 and 5, the communication links 407A-407n may be optical communication links, especially when the active component 401A-401n is defined to move relative to the passive component 403. However, it should also be understood that the E84 signals may be transmitted over a wired communication link 407A-407n when the active component 401A-401n is stationary with respect to the passive component 403. For example, because the near-tool container buffer system 205 as a whole (notwithstanding the moving components within the near-tool container buffer system 205) is stationary relative to the LP's 203 that it services, it is possible for the communication link 407A-407n between the near-tool container buffer system 205 and the access arbitration module 400 to be a wired communication link.

Figure 6:
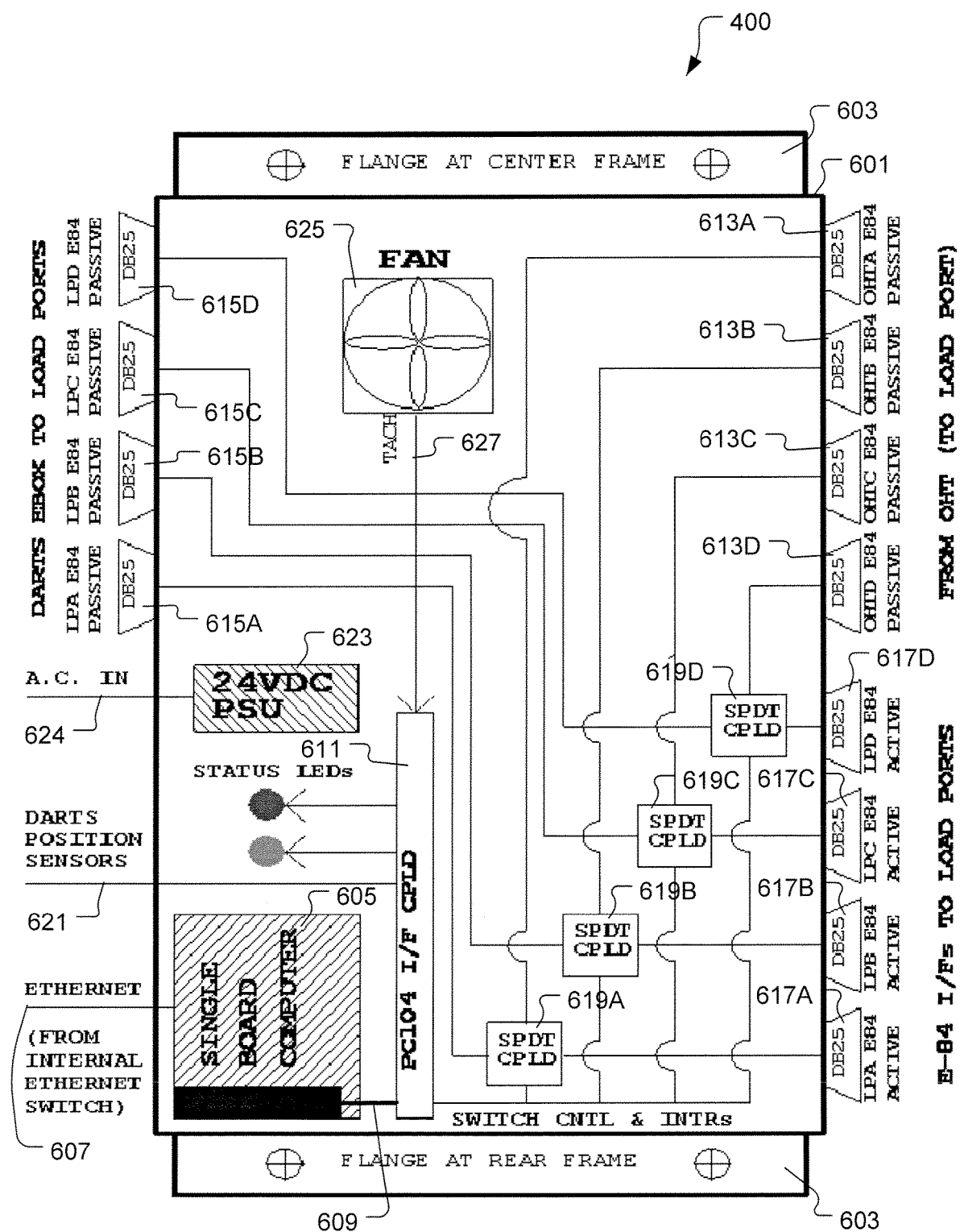
FIG. 6 shows an example architectural view of the access arbitration module 400, in accordance with one embodiment of the present invention.

FIG. 6 shows an example architectural view of the access arbitration module 400, in accordance with one embodiment of the present invention. The example access arbitration module 400 of FIG. 6 is configured to include communication link inputs 613A-613D from up to four OHT 207 E84 optical communication links, and to include communication link inputs 615A-615D from up to four near-tool container buffer system 205 E84 communication links, and to include communication link inputs 617A-617D from up to four LP 203 E84 communication links. It should be understood, however, that other embodiments of the access arbitration module 400 can be defined to include essentially any number of communication link inputs from essentially any number of active devices within the fab, and include essentially any number of communication link inputs from essentially any number of passive devices within the fab. In some embodiments, the communication link inputs 613A-613D, 615A-615D, and 617A-617D are defined as DB25 interface connectors.

Structurally, the access arbitration module 400 includes an enclosure 601 with flanges 603 for mounting the access arbitration module 400 within the fab. It should be appreciated that the flanges 603 are one example of many different ways by which the access arbitration module 400 can be mounted within the fab. In one embodiment, the access arbitration module 400 is mounted to a frame of the near-tool container buffer system 205.

The access arbitration module 400 can include a computer processor 605, which may be connected to receive communication signals through a communication port 607, such as an Ethernet communication port 607. For example, the access arbitration module 400 may be connected to communicate with the fab AMHS through the communication port 607. In some embodiments, the computer processor 605 is a single board computer with a PC104 interface. The access arbitration module 400 can also include a main board in connection to the computer processor 605. In some embodiments, the main board can include a PC104 connector 609 to interface to the computer processor 605. Also, in some embodiments, the main board can include a PC104 interface CPLD (complex programmable logic device) 611 defined to manage resources on the main board, such as E84 switching, sensor inputs, and fan monitoring, among others.

Also, in some embodiments, the main board can include a number of switch CPLDs 619A-619D defined and programmed to control timing and switching of communication signals between the active device communication link inputs 613A-613D, 615A-615D, and the passive device communication link inputs 617A-617D. In the example embodiment of FIG. 6, the access arbitration module 400 include four switch CPLDs 619A-619D, each of which is connected to a different one of the communication link inputs 613A-613D of the OHT 207, and a different one of the communication link inputs 615A-615D of the near-tool container buffer system 205, and a different one of the communication link inputs 617A-617D of the LPs 203. Specifically, the switch CPLD 619A is connected to each of the communication link inputs 613A, 615A, and 617A. The switch CPLD 619B is connected to each of the communication link inputs 613B, 615B, and 617B. The switch CPLD 619C is connected to each of the communication link inputs 613C, 615C, and 617C. The switch CPLD 619D is connected to each of the communication link inputs 613D, 615D, and 617D.

In the example of FIG. 6, the switch CPLDs 619A-619D are defined to control timing and switching of E84 handshake signals between the OHT 207 or the near-tool container buffer system 205 and the LPs 203. The switch CPLDs 619A-619D are also connected to the computer processor 605 by way of the PC104 interface CPLD 611, such that computer processor 605 is able to monitor all E84 signal traffic, and such that the switch CPLDs 619A-619D are able to generate and transmit maskable state change interrupts to the computer processor 605. It should be understood that while the example embodiment of the access arbitration module 400 as described herein utilizes CPLDs 611 and 619A-619D, other embodiments of the access arbitration module 400 can be implemented using alternative circuitry and/or programming logic to provide functionality equivalent to that of the CPLDs 611 and 619A-619D.

The access arbitration module 400 also includes sensor inputs 621 from a number of near-tool container buffer system 205 position sensors. For example, the sensor inputs 621 can include a sensor input for each active port 213a, 213b to indicate whether the active port 213a, 213b is in a retracted position or extended position. Also, the sensor inputs 621 can include a number of sensor inputs to indicate a position of the shuttle lift 215. It should be understood that the sensor inputs 621 provide information as to the state of the near-tool container buffer system 205 components to enable determine as to whether or not a vertical space between the OHT 207 and a given underlying LP 203 is blocked in any way by either an active port 213a, 213b or the shuttle lift 215.

In the event that the sensor inputs 621 indicate a clear vertical space between the OHT 207 and the underlying LP 203, the access arbitration module 400 can allow access to the underlying LP 203 by the OHT 207. In the event that the sensor inputs 621 indicate a blocked vertical space between the OHT 207 and the underlying LP 203, the access arbitration module 400 can either direct the near-tool container buffer system 205 to clear the vertical space while delaying access to the LP 203 by the OHT 207, or deny access to the LP 203 by the OHT 207. In this manner, the access arbitration module 400 is provided with sensory inputs necessary to accurately evaluate a current status of the vertical space above a given LP 203 to make decisions as to which active device can be cleared to access the given LP 203.

The access arbitration module 400 can also be equipped with an on-board AC to DC converter 623 having a AC power input 624. With its on-board power, the access arbitration module 400 can supply power to the various sensors through their respective sensor inputs 621. The access arbitration module 400 can also be equipped with a cooling fan 625. In some embodiment, the cooling fan 625 can have a tachometer output 627 connected to the computer processor 605 by way of the PC104 interface CPLD 611, such that computer processor 605 is able to monitor an operational status of the cooling fan 625.

The example access arbitration module 400 of FIG. 6 is defined to operate as an E84 multiplexer (MUX) between the OHT 207, the near-tool container buffer system 205, and the LPs 203 serviced by the near-tool container buffer system 205. In one embodiment, the example access arbitration module 400 of FIG. 6 is capable of supporting up to four LPs 203, with E84 access to each LP 203 by either the near-tool container buffer system 205 or OHT 207 on a first-come-first-serve basis.

In one embodiment, the access arbitration module 400 is programmed such that a default LP access allowance is provided to the near-tool container buffer system 205. In this embodiment, when the OHT 207 needs to access a given LP 203, the access arbitration module 400 will intercept an E84 signal (such as the E84 VALID signal, by way of example) from the OHT 207, and if the given LP 203 is ready for access and the vertical space between the OHT 207 and given LP 203 is clear, the access arbitration module 400 will connect the intercepted E84 signal through to the given LP 203 E84 communication port.

In some embodiments, the access arbitration module 400 can also be notified of an access reservation state of the given LP 203, which becomes an addition access check before the intercepted E84 signal will be transmitted through to the given LP 203 E84 communication port. For example, if a particular LP 203 is reserved for access by an OHT 207 that is on its way, another OHT 207 arriving first and requesting access to the particular LP 203 can be denied access to the particular LP 203 by the access arbitration module 400, by way of the access arbitration module 400 not transmitting the intercepted E84 signal from the first arriving OHT 207 through to the particular LP 203. In this manner, the access arbitration module 400 can be utilized to implement a look-ahead feature within the fab to provide for improved management of LPs 203 and associated fab resources.

It should be understood that OHT 207 to LP 203 access requires that the vertical space between the OHT 207 and LP 203 be clear of components that would obstruct the OHT's 207 access to the LP 203. For instance, in the OHT 207 with near-tool container buffer system 205 configuration of FIG. 2, the vertical space between the OHT 207 and LP 203 must be clear of the shuttle lift 215 and any active port 213a, 213b. However, the shuttle lift 215 and active ports 213a, 213b can be positioned at any other location outside of the vertical space between the OHT 207 and LP 203 that is required for OHT 207 access to the LP 203. For instance, if the OHT 207 is accessing the LP 203 through the vertical space shared by the active port 213a, the active port 213a will be fully retracted, but the active port 213b may be extended or retracted, and the shuttle lift 215 can be operating at any location other than within the vertical space through which the OHT 207 will access the LP 203. Once the container transfer between the OHT 207 and LP 203 is complete, the vertical space between the OHT 207 and LP 203 is freed for use by either the shuttle lift 215 of active port 213a, 213b.

In the event that the near-tool container buffer system 205 is down or partially disabled, separate sensors 621 between near-tool container buffer system 205 and the access arbitration module 400 will be used to determine each active port 213a, 213b and shuttle lift 215 location. This will be used to determine which OHT 207 to LP 203 vertical spaces are being blocked by the near-tool container buffer system 205 so that the blocked vertical spaces will not be switched to OHT 207 control, and corrective manual intervention may be utilized. Although mounted to the near-tool container buffer system 205, the sensors 621 are powered by and connected to the access arbitration module 400 so as not to be affected by the near-tool container buffer system 205 power status.

According to the E84 specification, the "conflict zone" is defined as being located between the OHT 207 and the LP 203. However, because the near-tool container buffer system occupies a greater volume than the LP 203, the conclusion of the "handshake" process between the OHT 207 and the LP 203 does not mean that the OHT 207 is clear of the near-tool container buffer system within the conflict zone. In one embodiment, this situation can be addressed by redefining the conflict zone of the OHT 207 as being located above the near-tool container buffer system 205. In another embodiment, this situation can be addressed by utilizing a software timer to account for the OHT 207 completely retracting above the near-tool container buffer system 205 conflict zone. This software timer can be used to determine when it is safe to move the shuttle lift 215 or active port 213a, 213b across the vertical space through which the OHT 207 was accessing the LP 203.

With the E84 specification, the TA1 timer is used by the OHT 207 to "time-out" if a L_REQ ON signal or U_REQ ON signal is not received within a specified time (typically 2 seconds) from the OHT 207 issuance of the VALID signal. If the TA1 timer expires (i.e., no L_REQ or U_REQ response signal is transmitted and received), then the OHT 207 will be forced to go around its loop of travel again. Expiration of the TA1 timer in the OHT 207 with near-tool container buffer system 205 configuration of FIG. 2 may occur because the VALID signal is not allowed to pass down from the OHT 207 to the LP 203 unless the vertical space between the OHT 207 and LP 203 is clear and the near-tool container buffer system 205 has relinquished control of the access arbitration module 400 to the OHT 207. To avoid this TA1 timer expiration, the TA1 timer can be adjusted to a longer timer duration, such as about 30 seconds by way of example. This extension of the TA1 timer will prevent needless OHT 207 loops.

In the example access arbitration module 400 embodiment of FIG. 6, there are five total CPLDs, including the PC104 interface CPLD 611, and each of the four switch CPLDs 619A-619D. However, it should be understood that in other embodiments, the access arbitration module 400 can be defined to include any number CPLDs necessary for the particular implementation. More specifically, the access arbitration module 400 can be defined to include one CPLD for the processor 605 interface and one CPLD for each passive device connected to the access arbitration module 400 for which access is to be controlled by the access arbitration module 400.

Figure 7:
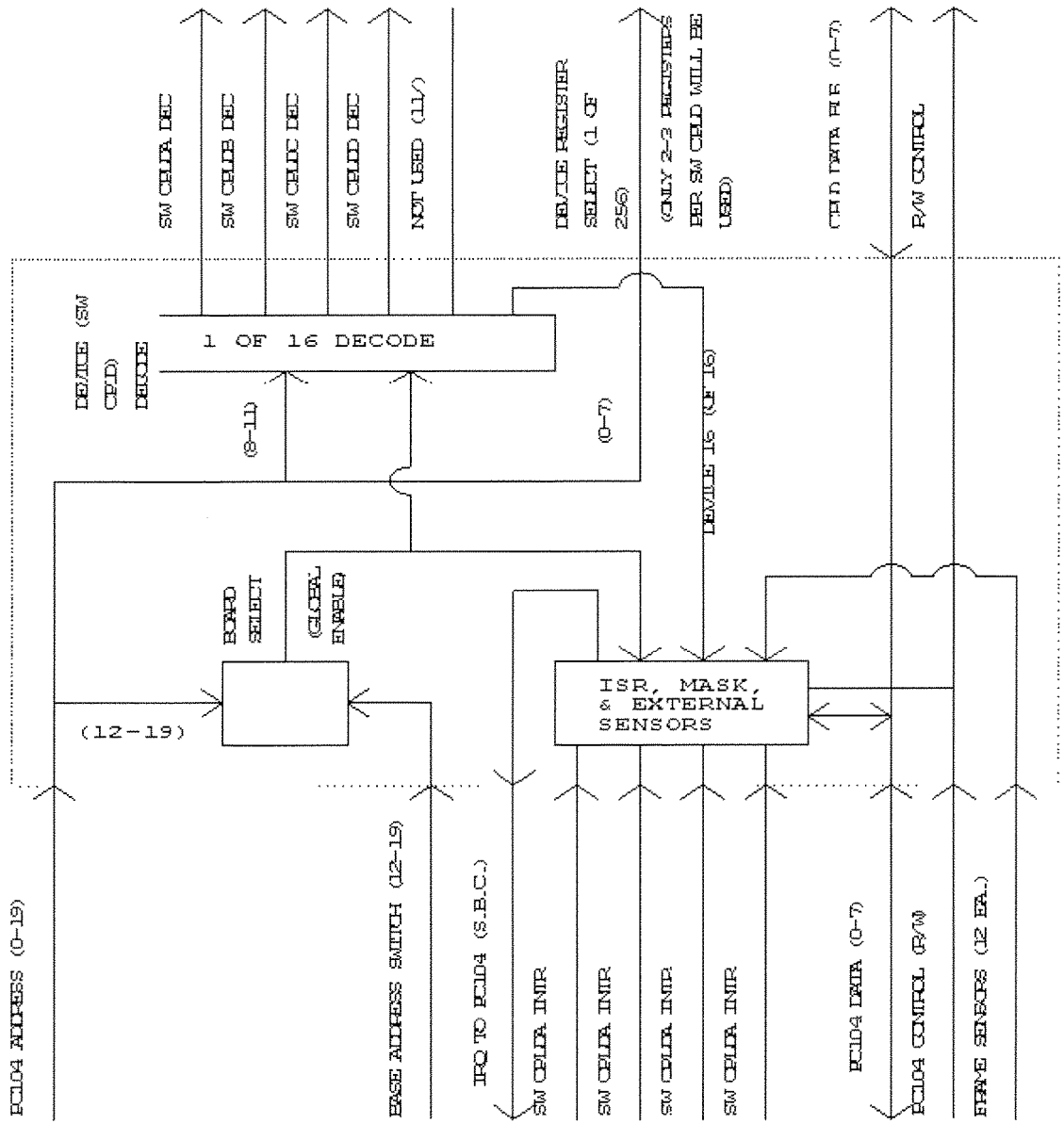
FIG. 7 shows an overall block diagram of the PC104 interface CPLD 611 in the example access arbitration module 400 of FIG. 6, in accordance with one embodiment of the present invention.

The PC104 interface CPLD 611 is responsible for interfacing the main board of the access arbitration module 400 to the PC104 interface 609 of the computer processor 605. The PC104 interface CPLD 611 is defined to interpret the address and transaction on the PC104 bus and direct intended signal traffic to the resources on the main board of the access arbitration module 400. FIG. 7 shows an overall block diagram of the PC104 interface CPLD 611 in the example access arbitration module 400 of FIG. 6, in accordance with one embodiment of the present invention. As shown in FIG. 7, the PC104 interface CPLD 611 includes 20 PC104 address lines (0-19) entering the CPLD for main address decoding.

There is an 8 bit base address configuration switch on the board, which when set is compared to the upper 8 bits of PC104 address to determine if the transaction is intended for a resource on the main board. When the upper 8 bits of PC104 address match the base address configuration switch, a global enable signal is generated that validates the processor 605 transaction to the main board. In this manner, the decode logic on the board can handle up to 4096 unique register/address locations for a variety of resources (address bits 0-11). The resources are set up as 16 blocks of 256 bytes each, accommodating 16 devices of any type which can each contain a maximum of 256 eight bit register or memory locations. In one embodiment, memory locations are "memory mapped" to the PC104 memory address space which facilitates the large number of available register/memory locations beyond the standard ISA I/O space.

The global enable signal goes to the 1 of 16 device select logic. In the example embodiment of FIG. 6, there are four switch CPLDs 619A-619D, and internal registers within the PC104 Interface CPLD 611. The device decode section will generate the appropriate decode/enable line to its respective switch CPLD 619A-619D. The switch CPLDs 619A-619D are defined to re-route E84 handshake signals between the OHT 207 or the near-tool container buffer system 205 to the LPs 203.

The lower 8 bits of PC104 address (0-7) are passed directly to the switch CPLDs 619A-619D for internal register selection. Eight bits of PC104 data are run into the PC104 Interface CPLD 611 for internal register write/read back, and are also passed thru to the switch CPLDs 619A-619D for write/read back purposes. PC104 Control (for write/read purposes) route into and pass thru the CPLD 611. The ISR & MASK registers are used to generate a maskable interrupt to the processor 605 and inform it of which specific switch CPLD 619A-619D has generated the interrupt request. The 12 frame sensors feed this CPLD (active port retraction and shuttle position) to determine whether a given vertical space is available to the OHT 207. Two LEDs (one green, one red) are provided for status indication. When power is applied to the access arbitration module 400, the green LED will blink until software has initialized, at which time software turns the LED to be solid on. The red LED indicates a fault condition.

Figure 8:
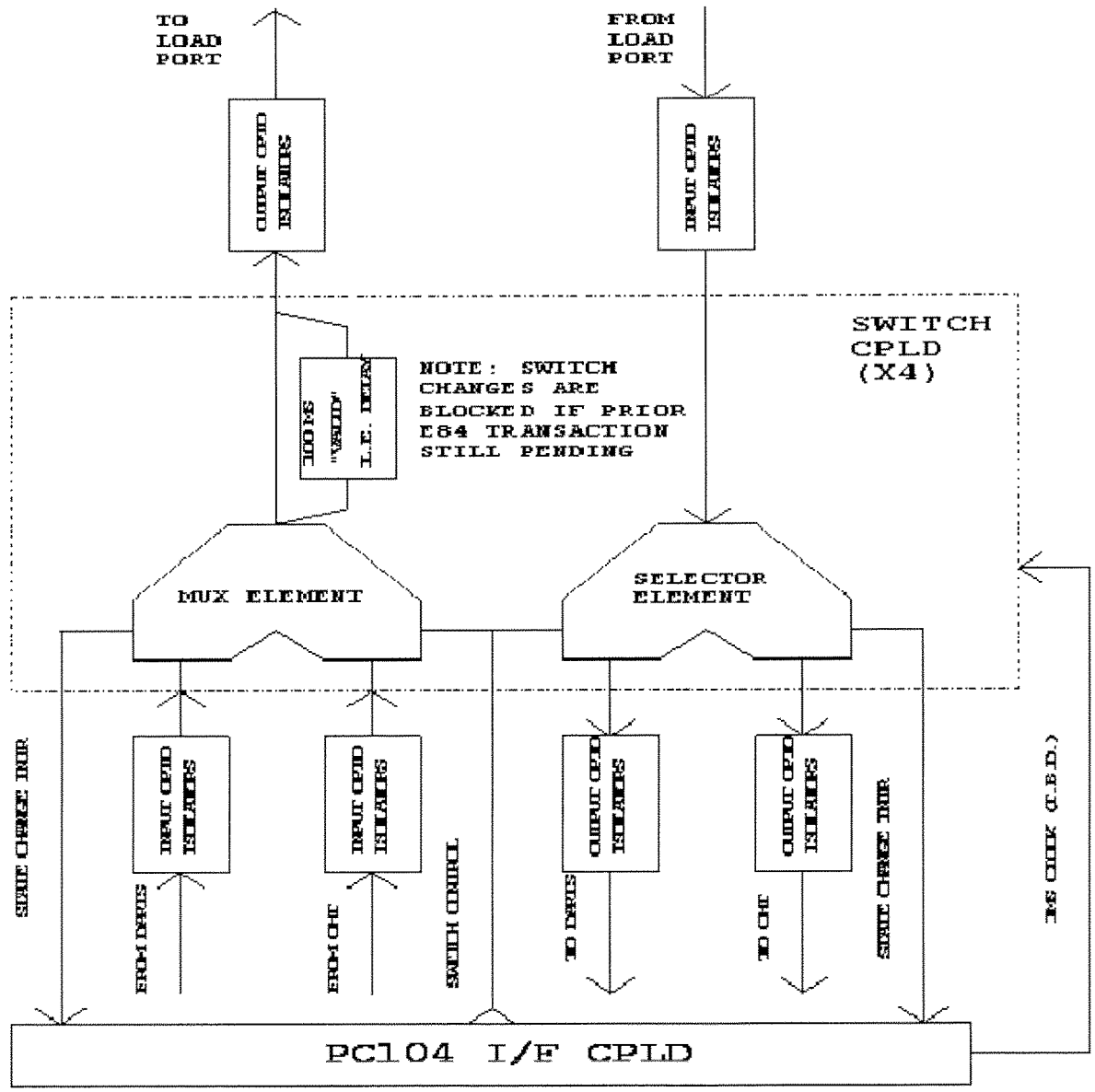
FIG. 8 shows an overall block diagram of each switch CPLD 619A-619D in the example access arbitration module 400 of FIG. 6, in accordance with one embodiment of the present invention.

FIG. 8 shows an overall block diagram of each switch CPLD 619A-619D in the example access arbitration module 400 of FIG. 6, in accordance with one embodiment of the present invention. The switch CPLDs 619A-619D are defined to re-route the E84 control lines from the near-tool container buffer system 205 or the OHT 207 to the LPs 203. The processor 605 operates to determine the appropriate time to make the switchover. Software may configure a maskable state change interrupt on any of the access arbitration module 400 active device communication link inputs 613A-613D, 615A-615D, and passive device communication link inputs 617A-617D. For example, an interrupt could be enabled for a state change on the E84 "VALID" signal, indicating that either the OHT 207 or the near-tool container buffer system 205 is requesting a handoff to an LP 203. Software can field this interrupt, determine when it is safe to switch, and then write a switch bit in a control register within the corresponding switch CPLD 619A-619D to perform the switch. In one embodiment, as a safety precaution, no changes in the switch shall be allowed by the switch CPLD 619A-619D unless the prior transaction has concluded.

As shown in FIG. 8, each switch CPLD 619A-619D includes a MUX element defined to route either the near-tool container buffer system 205 or OHT 207 E84 signals to a given LP 203. Opto-isolator logic feeds this section directly, selects the source path under software control, and feeds the chosen E84 signals to the opto-isolators connected to that respective LP 203. Each switch CPLD 619A-619D also includes a 100 millisecond "VALID DELAY" on the leading edge of the VALID E84 signal being sent to the LP 203 is to ensure E84 timing setup between CS0/CS1 and the VALID E84 signal being sent to the LP 203. Each switch CPLD 619A-619D also includes a selector element defined to route the LP 203 E84 signals to either the near-tool container buffer system 205 or the OHT 207.

During normal operation of the access arbitration module 400, both the OHT 207 and the shuttle lift 215 of the near-tool container buffer system 205 will be able to access an LP 203 for container delivery/pick-up. The access arbitration module 400 will operated to manage contention between the OHT 207 and shuttle lift 215 for access to the same LP 203. The access arbitration module 400 will also operate to ensure that the travel trajectory of the OHT 207 for accessing the LP 203 is clear of near-tool container buffer system 205 components, including the active ports 213a, 213b and shuttle lift 215. Access to the LP 203 by the OHT 207 will comply with the standard access protocol, such as the E84 protocol. Therefore, neither the LP 203 nor OHT 207 will require modification for operation with the access arbitration module 400. Also, the access arbitration module 400 is defined to maintain electrical and mechanical characteristics of the standard access protocol, e.g., E84 protocol, as expected/required by both the LP 203 and OHT 207, including but not limited to form fit, voltage, electrical current, and optical link isolation.

When the OHT 207 initiates access to an LP 203 for direct container transfer to the LP 203, the access arbitration module 400 will intercept the access protocol communication signals, e.g., E84 signals, and exert control over the access request by either transmitting the access protocol communication signals through to their expected destination, or by denying transmission of the access protocol communication signals through to their expected destination, and thereby blocking the access protocol communication necessary to perform the access operation. Also, before allowing the LP 203 to respond to the OHT 207 with an appropriate access protocol communication signal, e.g., L_REQ or U_REQ, the access arbitration module 400 must ensure that the active ports 213a, 213b and shuttle lift 215 of the near-tool container buffer system 205 are in a safe position for OHT 207 access to the LP 203, i.e., are clear of the vertical space between the OHT 207 and the LP 203 to be accessed. In this manner, the access arbitration module 400 ensure that no mechanical/physical interference will occur when the OHT 207 moves to transfer a container to/from the LP 203.

Figure 9:
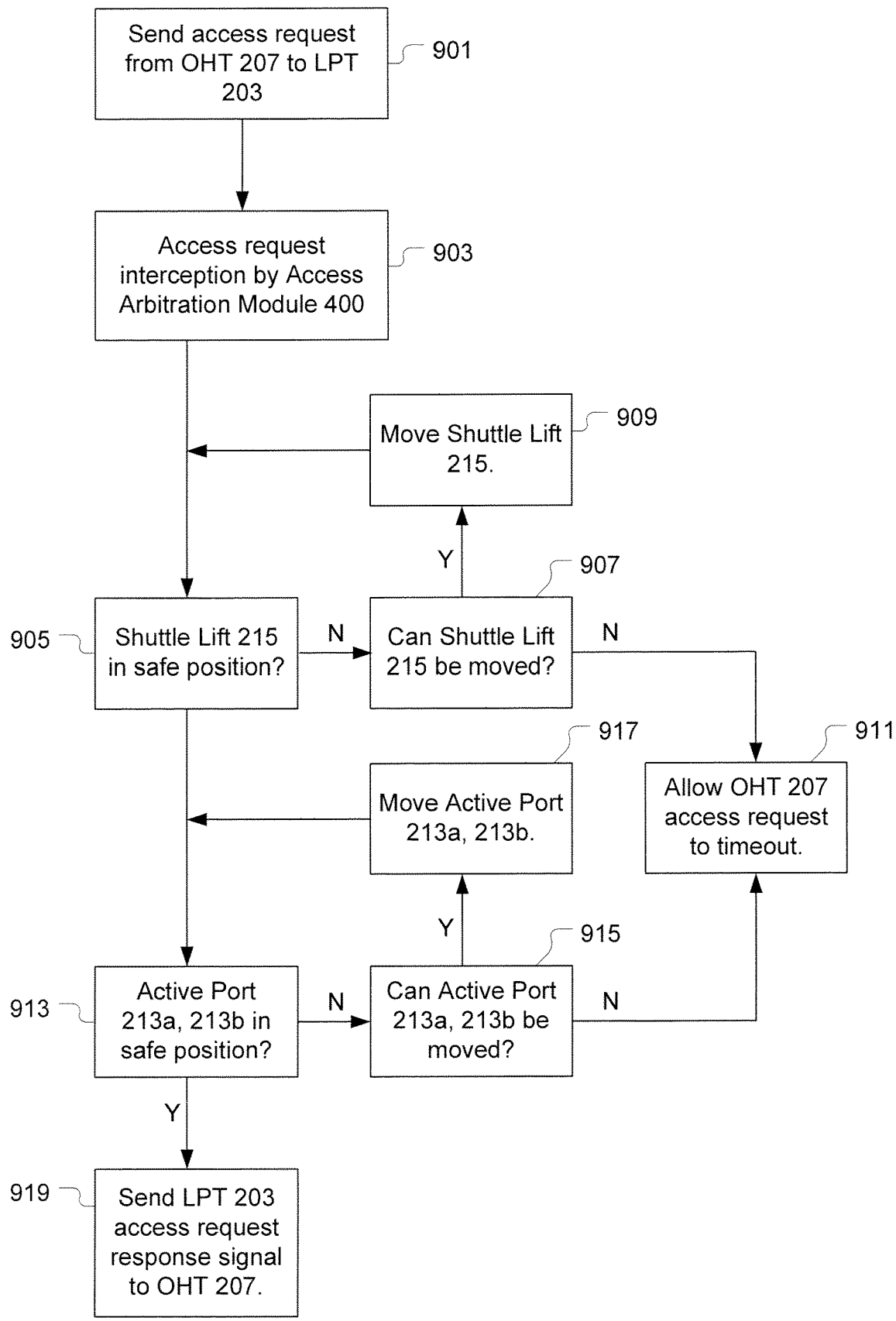
FIG. 9 is shows a flowchart of a method by which the access arbitration module 400 operates to ensure that the near-tool container buffer system 205 components are in a safe position for OHT 207 access to the LP 203, in accordance with one embodiment of the present invention.

FIG. 9 is shows a flowchart of a method by which the access arbitration module 400 operates to ensure that the near-tool container buffer system 205 components are in a safe position for OHT 207 access to the LP 203, in accordance with one embodiment of the present invention. In operation 901, the OHT 207 transmits an access request to the LP 203, such as an E84 transfer request. In operation 903, the access arbitration module 400 intercepts the access request transmitted from the OHT 207 to the LP 203. In operation 905, the access arbitration module 400 checks the sensor input signals 621 from the near-tool container buffer system 205 to determine whether or not the shuttle lift 215 is in a safe position, i.e., is out of the vertical travel path of the OHT 207 in accessing the LP 203. If the shuttle lift 215 is not in the safe position, an operation 907 is performed to determine whether or not the shuttle lift 215 can be moved to the safe position. If the shuttle lift 215 can be moved the safe position, an operation 909 is performed to move the shuttle lift 215 to the safe position. Then, the method reverts back to operation 905. If the shuttle lift 215 cannot be moved to the safe position, an operation 911 is performed to allow the OHT 207 access request to timeout, e.g., by allowing the TA1 timeout clock to run out.

With reference back to operation 905, if the shuttle lift 215 is in the safe position, an operation 913 is performed to determine whether or not the relevant active port 213a, 213b is in a safe position, i.e., is out of the vertical travel path of the OHT 207 in accessing the LP 203. If the relevant active port 213a, 213b is not in the safe position, an operation 915 is performed to determine whether or not the relevant active port 213a, 213b can be moved to the safe position. If the port 213a, 213b can be moved to the safe position, an operation 917 is performed to move the relevant active port 213a, 213b to the safe position. Then, the method reverts back to operation 913. If the relevant active port 213a, 213b cannot be moved to the safe position, the operation 911 is performed to allow the OHT 207 access request to timeout, e.g., by allowing the TA1 timeout clock to run out. With reference back to operation 913, if the relevant active port 213a, 213b is in the safe position, the method proceeds with an operation 919 in which the access arbitration module 400 operates to transmit the required LP 203 access request response to the OHT 207, such that the OHT 207 and LP 203 can proceed with the container transfer operation.

In one embodiment, the access arbitration module 400 is defined to avoid simultaneous access by the shuttle lift 215 and OHT 207 to the same LP 203, when operating under the first-come-first-serve basis. If a container transfer operation between the OHT 207 and LP 203 is initiated, the shuttle lift 215 will not be permitted to access the LP 203 being accessed by the OHT 207. Similarly, if a container transfer operation between the shuttle lift 215 and LP 203 is initiated, the OHT 207 will not be permitted to access the LP 203 being accessed by the shuttle lift 215.

Figure 10:
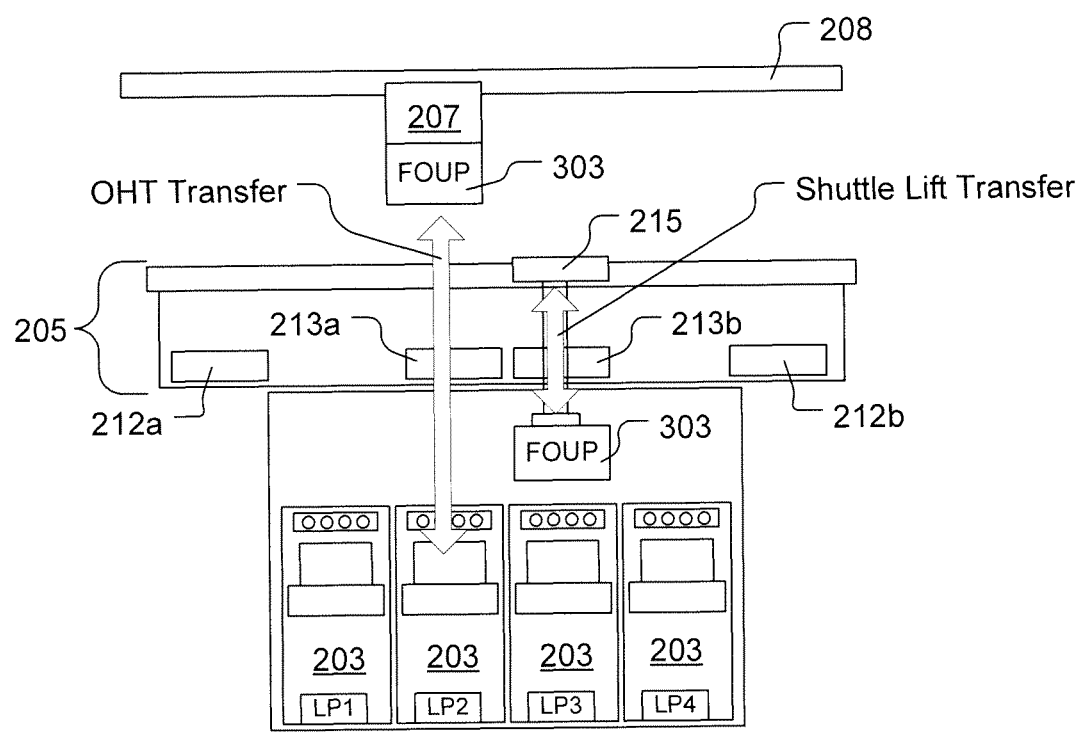
FIG. 10 shows an instance in which the OHT 207 is actively transferring a container to/from LP 203 (LP2), while the shuttle lift 215 is actively transferring a container to/from LP 203 (LP3) that is positioned next to LP 203 (LP2).
Figure 11:
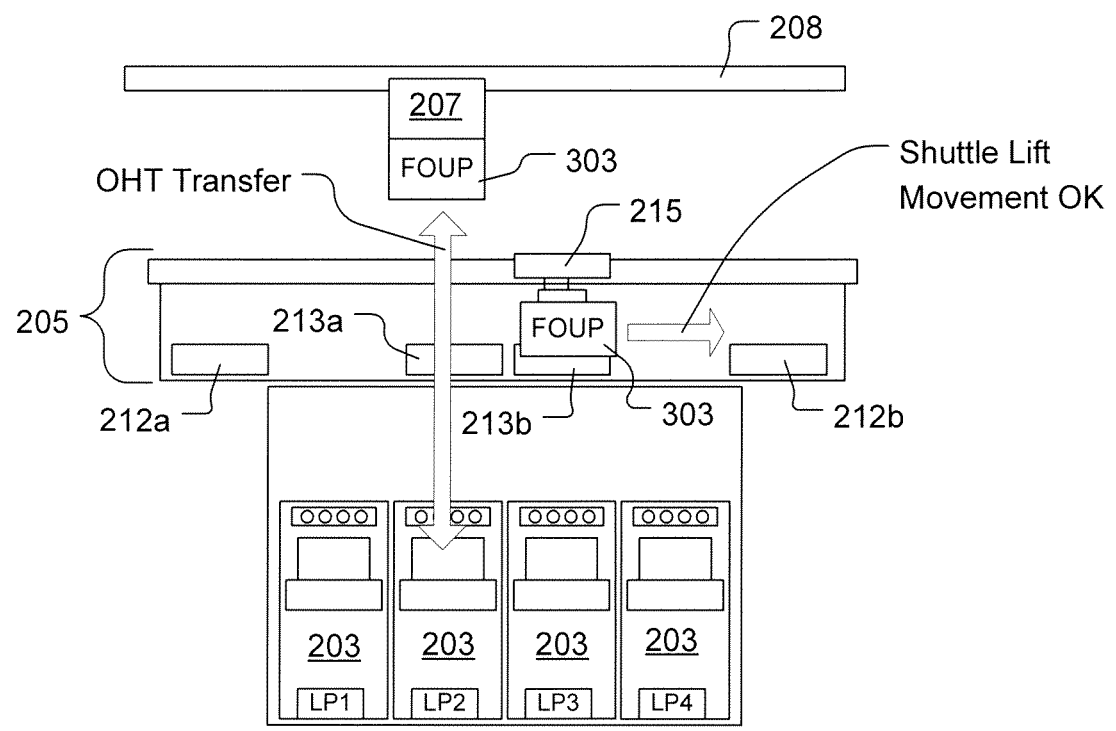
FIG. 11 shows another example instance in which the OHT 207 is actively transferring a container to/from LP 203 (LP2), while the shuttle lift 215 is moving a container within the near-tool container buffer system 205 in a direction away from the vertical space through which the OHT 207 is accessing the LP 203 (LP2).
Figure 12:
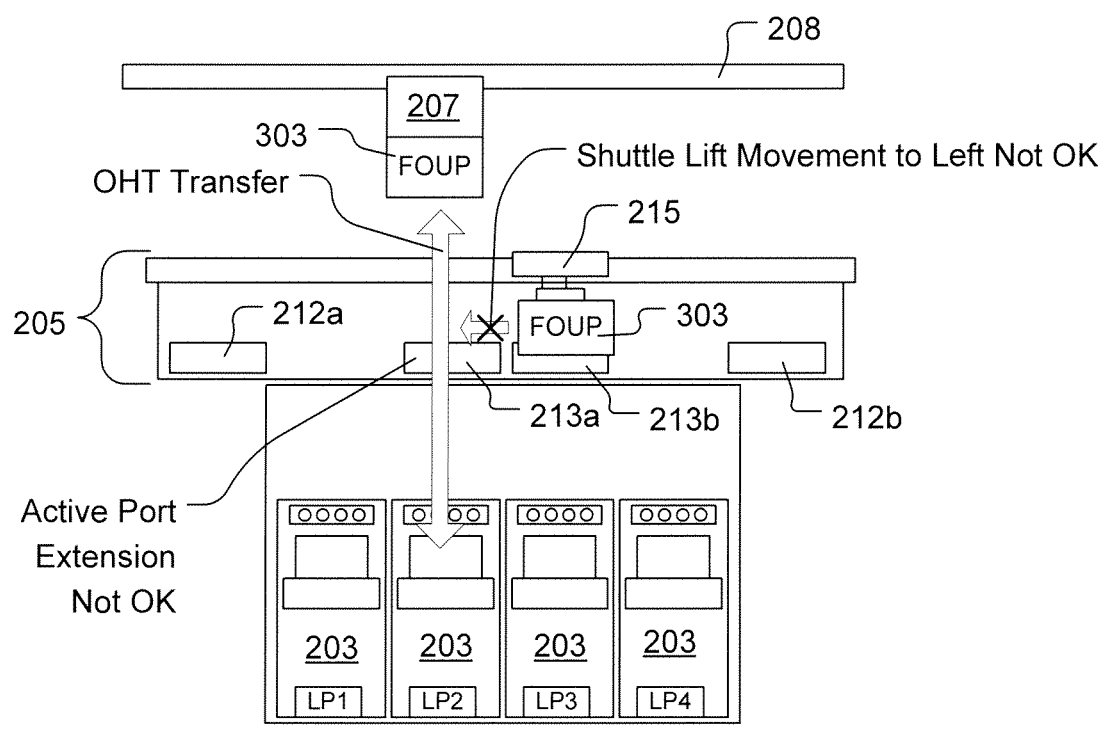
FIG. 12 demonstrates how movements of the shuttle lift 215 and active port 213a are restricted when the OHT 207 is accessing the LP 203 (LP2).

It should be understood that the access arbitration module 400 is programmed to allow for simultaneous movements of the shuttle lift 215, active ports 213a, 213b, and OHT 207 whenever and wherever possible. For example, FIG. 10 shows an instance in which the OHT 207 is actively transferring a container to/from LP 203 (LP2), while the shuttle lift 215 is actively transferring a container to/from LP 203 (LP3) that is positioned next to LP 203 (LP2). FIG. 11 shows another example instance in which the OHT 207 is actively transferring a container to/from LP 203 (LP2), while the shuttle lift 215 is moving a container within the near-tool container buffer system 205 in a direction away from the vertical space through which the OHT 207 is accessing the LP 203 (LP2). FIG. 12 demonstrates how movements of the shuttle lift 215 and active port 213a are restricted when the OHT 207 is accessing the LP 203 (LP2). Specifically, as shown in FIG. 12, the access arbitration module 400 operates to prevent the shuttle lift 215 and active port 213a from traversing into the vertical space through which the OHT 207 is actively accessing the LP 203 (LP2).

In one embodiment, the access arbitration module 400 is programmed such that E84 container transfers that have already started are completed before allowing an operator to switch between operating modes, i.e., between OHT 207/near-tool container buffer system 205 standard operating mode and the OHT 207 direct access operating mode by way of the access arbitration module 400.

Based on the foregoing, it should be understood that the access arbitration module 400 provides an arbitration system to manage access to a given LP 203 at a given time by any of multiple container handling entities, i.e., active devices, within a fab. The access arbitration module 400 provides independent access control to each LP 203 at given time. The access arbitration module 400 can also be defined to communicate with a fab controller to obtain information about incoming container transport entities that may request access to a particular LP 203 and provide look-ahead management of those incoming container transport entities. Thus, the access arbitration module 400 provides a forecasting ability for container transport entity access to a given LP 203.

Also, in one embodiment, the access arbitration module 400 can be equipped with a wireless communication ability to enable direct handshake processing with OHT 207 vehicles before they arrive at the LP 203. Today, the OHT 207 vehicles communicate by way of optical sensors. However, it is contemplated that fabs may be wirelessly networked so that container transport entities within the fab can communicate wirelessly with other entities within the fab. With such wireless networking in place, it may be possible for an inbound container transport entity to communicate with the access arbitration module 400 before its arrival at the tool LP 203 to either begin the handshake process or be redirected if the tool is not available. This will allow the container transport vehicle to either proceed with its container drop off/pick up process immediately upon arrival at the tool LP 203, or be redirected and continue moving on to an alternate destination in the fab. In this embodiment, the container transport vehicle may not need to stop at the tool and perform the handshake process before being redirected to the alternate destination in the fab, thereby improving workpiece movement efficiency through the fab.

It should be understood that any active device within the fab that has a communication link to a passive device in the fab can be made subject to access control by way of the access arbitration module 400 intercepting the communication link. The access arbitration module 400 can interrupt any one or more required container transfer signals between the active and passive devices to enforce arbitration control. Also, it should be appreciated that the access arbitration modules 400 can be networked together. Also, the access arbitration modules 400 can be cascaded within the fab by connecting an access arbitration module 400 as an active device to another access arbitration module 400. Additionally, it should be understood that the access arbitration module 400 can be extended to accommodate any number of active devices and passive devices within the fab.

The access arbitration module 400 represents an N×N Tool LP 203 E84 switch with collision avoidance and monitoring capability. The access arbitration module 400 can be positioned as part of the near-tool container buffer system 205, but is defined independent from the near-tool container buffer system 205. The access arbitration module 400 enable both the OHT 207 and shuttle lift 215 to drop off to LPs 203. The access arbitration module 400 can operate with the near-tool container buffer system 205 powered on, powered off, or in maintenance mode. Therefore, access by the OHT 207 to the LP 203 is not dependent on the availability of the near-tool container buffer system 205.

As discussed above, the access arbitration module 400 has dedicated sensors to detect the state of the near-tool container buffer system 205, so as to avoid collisions between the OHT 207 and the shuttle lift 215 and active ports 213a, 213b of the near-tool container buffer system 205. The processor 605 on board the access arbitration module 400 is capable of communicating with the near-tool container buffer system 205, the MCS Host, and the tool 201, by way of the Ethernet connection 607. In one embodiment, such as that shown in FIG. 6, the access arbitration module 400 includes twelve E84 connections (four near-tool container buffer system-to-passive connections, four LP 203-to-active connections, and four OHT 207-to-passive connections).

The CPLDs 611 and 619A-619D control all E84 switching operations. The access arbitration module 400 is independently powered and includes powered sensor inputs 621 for EMO, active port 213a, 213b position state, and shuttle lift 215 position state.

The access arbitration module 400 allows OHTs 207 to transfer containers 303 to both the near-tool container buffer system and tool LPs 203 simultaneously. The access arbitration module 400 also provides an ability to manage OHT 207 traffic by tapping/intercepting the near-tool container buffer system 205, LP 203, and OHT 207 signals. The access arbitration module 400 can be programmed to manage incoming OHT 207 vehicles through the fab controller (MES/MCS) before they arrive at the LP 203 location. Also, in one embodiment, if an LP 203 is not available, the access arbitration module 400 can be programmed to allow the OHT 207 to drop off its container to the near-tool container buffer system 205 buffer, thus reducing OHT 207 congestion.

The access arbitration module 400 is scalable across multiple tools 201 and near-tool container buffer systems 205. The access arbitration module 400 allows for the addition of a wireless feature to directly handshake with OHT 207 vehicles before they arrive at the LP 203 tool 201. In this manner, the access arbitration module 400 enables a "look-ahead" feature to start the handshake communication process between OHTs 207 and LPs 203/near-tool container buffer system 205 before the OHT 207 vehicle arrives.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. An apparatus, comprising:
   a plurality of communication interfaces, at least two of the plurality of communication interfaces defined to connect to separate container movement systems, each container movement system configured to transport a workpiece container within a semiconductor fabrication facility, at least one of the plurality of communication interfaces defined to connect to a passive component, the passive component representing a destination for one or more workpiece containers to be transported by one or more of the container movement systems;
   at least one sensor input for receiving position state signals from one or more of the container movement systems; and
   circuitry connected to each of the plurality of communication interfaces, the circuitry defined to control transmission of signals between the plurality of communication interfaces such that each of the plurality of communication interfaces that is connected to a given passive component will receive signals from only one other of the plurality of communication interfaces at a given time, the circuitry further defined to process position state signals received from one or more of the container movement systems to control transmission of signals between the plurality of communication interfaces to avoid collision between any two or more container movement systems, wherein the one or more container movement systems are controlled in part by signals output by the circuitry.

2. The apparatus as recited in claim 1, wherein the given passive component is configured to receive at least one container from any of a plurality of active components in communication with respective ones of the plurality of communication interfaces.

3. The apparatus as recited in claim 1, wherein the separate container movement systems include a near-tool container buffer system and an overhead container transport system.

4. The apparatus as recited in claim 3, wherein the passive component is a loadport for a semiconductor processing tool.

5. The apparatus as recited in claim 1, wherein the separate container movement systems include an autonomous guided vehicle.

6. The apparatus as recited in claim 5, wherein the passive component is a loadport for a semiconductor processing tool.

7. The apparatus as recited in claim 1, wherein the passive component is a loadport for a semiconductor processing tool.

8. The apparatus as recited in claim 1, wherein the circuitry is defined to control transmission of signals between the plurality of communication interfaces based on access authorization settings of components connected to the plurality of communication interfaces.

9. The apparatus as recited in claim 1, wherein at least four of the plurality of communication interfaces are defined to connect to separate container movement systems, and wherein at least four of the plurality of communication interfaces are connected to separate passive components.

10. The method as recited in claim 1, wherein the circuitry is defined to block transmission of signals to ensure that each of the plurality of communication interfaces that is connected to the given passive component will receive signals from only one other of the plurality of communication interfaces at the given time.

11. A method, comprising:
    receiving a plurality of signals at a respective plurality of communication interfaces, the plurality of signals directed to a target communication interface present in addition to the respective plurality of communication interfaces, wherein the target communication interface is connected to a passive component, wherein separate container movement systems are controlled based on transmission of the received plurality of signals, each container movement system configured to transport a workpiece container within a semiconductor fabrication facility;
    receiving position state signals from one or more of the separate container movement systems;
    processing the position state signals received from one or more of the separate container movement systems to determine whether or not any signal received at the plurality of communication interfaces can be transmitted to the target communication interface at a given time to avoid collision between any two or more of the separate container movement systems; and
    upon determining that a signal received a given one of the plurality of communication interfaces can be transmitted to the target communication interface at the given time, controlling transmission of the received plurality of signals such that only the signal received at the given one of the plurality of communication interfaces is transmitted to the target communication interface at the given time, wherein the signal transmitted to the target communication interface at the given time is associated with control of a container movement system.

12. The method as recited in claim 11, wherein the passive component is configured to receive at least one container from any of a plurality of active components in communication with respective ones of the plurality of communication interfaces.

13. The method as recited in claim 11, wherein the plurality of communication interfaces are respectively connected to separate container movement systems.

14. The method as recited in claim 13, wherein the separate container movement systems include a near-tool container buffer system and an overhead container transport system.

15. The method as recited in claim 14, wherein the target communication interface is connected to a loadport for a semiconductor processing tool.

16. The method as recited in claim 15, wherein the separate container movement systems include an autonomous guided vehicle.

17. The method as recited in claim 16, wherein the target communication interface is connected to a loadport for a semiconductor processing tool.

18. The method as recited in claim 11, wherein determining whether or not any newly received signal can be transmitted to the target communication interface at the given time includes verifying that an access authorization setting of the passive component connected to the target communication interface allows for transmission of the newly received signal to the passive component.

19. The method as recited in claim 11, further comprising:
    upon determining that a newly received signal cannot be transmitted to the target communication interface at the given time, blocking transmission of the newly received signal to the target communication interface.

* * * * *